(12) United States Patent
Green

(10) Patent No.: US 6,547,028 B1
(45) Date of Patent: Apr. 15, 2003

(54) AXLE MOUNTING ARRANGEMENT

(75) Inventor: Timothy E. Green, Clayton, NC (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 09/669,191

(22) Filed: Sep. 25, 2000

(51) Int. Cl.[7] .......................... B60K 17/00; B60K 17/22
(52) U.S. Cl. ...................... 180/349; 180/378; 180/906; 280/149.1
(58) Field of Search .................. 180/21, 209, 905, 180/906, 348, 378, 266, 235, 349, 352, 354, 360; 280/149.2, 405.1, 676, 638, 124.111; 301/125

(56) References Cited

U.S. PATENT DOCUMENTS

| | | | |
|---|---|---|---|
| 1,761,334 A | * 6/1930 | Fry | ............................ 280/781 |
| 2,294,945 A | * 9/1942 | Zink | ............................ 180/291 |
| 3,702,196 A | 11/1972 | Krutis | |
| 3,730,508 A | * 5/1973 | Marian et al. | ................. 267/52 |
| 3,802,716 A | * 4/1974 | Wiers | ............................ 280/638 |
| 3,811,699 A | 5/1974 | Casey | |
| 3,949,826 A | 4/1976 | Shealy | |
| 4,061,361 A | * 12/1977 | Felburn | ........................ 280/681 |
| 4,090,721 A | * 5/1978 | Wedin et al. | ................ 280/784 |
| 4,340,235 A | 7/1982 | Thompson | |
| 5,032,029 A | 7/1991 | Pratt et al. | |
| 5,046,756 A | * 9/1991 | Hertrick | ................. 280/124.17 |
| 5,060,962 A | * 10/1991 | McWethy | ................. 280/304.1 |
| 5,368,121 A | * 11/1994 | Priefert | ........................ 180/209 |
| 5,564,725 A | * 10/1996 | Brazeal | ..................... 280/407.1 |
| 5,671,934 A | 9/1997 | Harrod | |
| 5,971,408 A | 10/1999 | Mandel et al. | |
| 6,247,713 B1 | * 6/2001 | Konop | ........................ 280/86.5 |

* cited by examiner

*Primary Examiner*—Paul N. Dickson
*Assistant Examiner*—David R. Dunn
(74) *Attorney, Agent, or Firm*—James R Smith; Diana L Charlton

(57) ABSTRACT

The present invention provides an axle mounting arrangement for mounting an axle assembly to the frame of a vehicle. A plurality of attachment structures are provided on the frame, and at least one support structure is provides for coupling the axle assembly with the attachment structures at different locations along the frame.

16 Claims, 4 Drawing Sheets

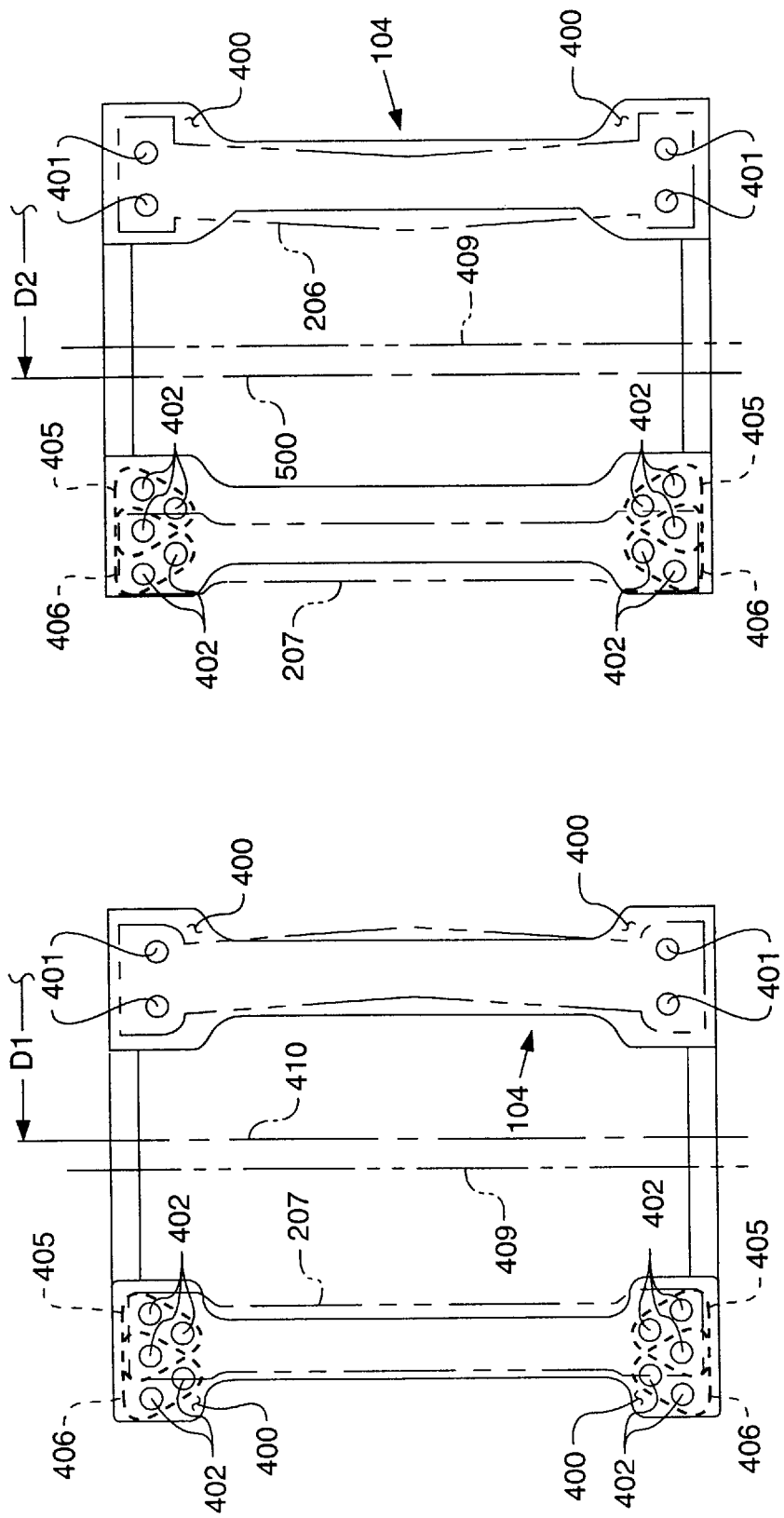

US 6,547,028 B1

AXLE MOUNTING ARRANGEMENT

TECHNICAL FIELD

This invention related to an axle mounting arrangement and more particularly to an axle mounting arrangement therefore that allows an axle to be mounted to a single size frame at different locations along the frame.

BACKGROUND ART

In the manufacture of a vehicle, the vehicle's construction and design is oftentimes a by-product of the functional specifications required of the vehicle in question. The aforementioned functional specifications typically drive such physical parameters as frame size, wheelbase, etc.

Conventional methods for providing a vehicle with varying wheelbases typically require the frame to be especially constructed to match the wheelbase requirements. However, sometimes it is desirable to use a single-size frame for different vehicle models. In such cases, it would be beneficial and economical to provide a means to couple axle assemblies to these frames with a minimum of frame modification, while providing the vehicle with a variety of wheelbase configurations.

One prior art example which teaches variable wheelbase configurations is disclosed in U.S. Pat. No. 3,702,196 which issued on Nov. 7, 1972 to Edward W. Krutis. In this design, the longitudinal position of an oscillating steer axle may be adjusted by use of a cap screw acting on a bearing cap. "Tightening" turns of the cap screw produce a resultant force on the cap, thereby longitudinally translating the steer axle, relative to the frame, until the opposing bearing contacts a stationary spacer. While this design may be adequate for its intended purpose of adjusting the bearings, the fact that it is used on axles which are not coupled to drive lines may hinder its application on these types of vehicles.

The present invention is directed to overcoming one or more of the problems as set forth above.

DISCLOSURE OF THE INVENTION

In one aspect of the present invention, an axle mounting arrangement is provided for mounting an axle assembly to the frame of a vehicle having a front axle, a rear axle, a forward portion and a rearward portion. The axle mounting arrangement has a plurality of attachment structures provided on the frame, and at least one support structure for coupling the axle assembly with the attachment structures at different locations along the frame.

In another aspect of the present invention, an axle mounting system for providing a frame of a vehicle with multiple wheelbase configurations is provided for a vehicle having a rear axle assembly having differential housing trunnions. Provided is a curvilinear front support structure adapted for supporting the rear axle assembly, a substantially linear rear support structure adapted for supporting the rear axle assembly, and a plurality of fasteners for coupling the front support structure and the rear support structure with the frame.

BRIEF DESCRIPTION OF THE DRAWINGS

FIG. 4 is a diagrammatic bottom plan view of the frame showing one configuration of the support structures.

FIG. 5 is a diagrammatic bottom plan view of the frame showing another configuration of the support structures.

BEST MODE FOR CARRYING OUT THE INVENTION

Figure 1:
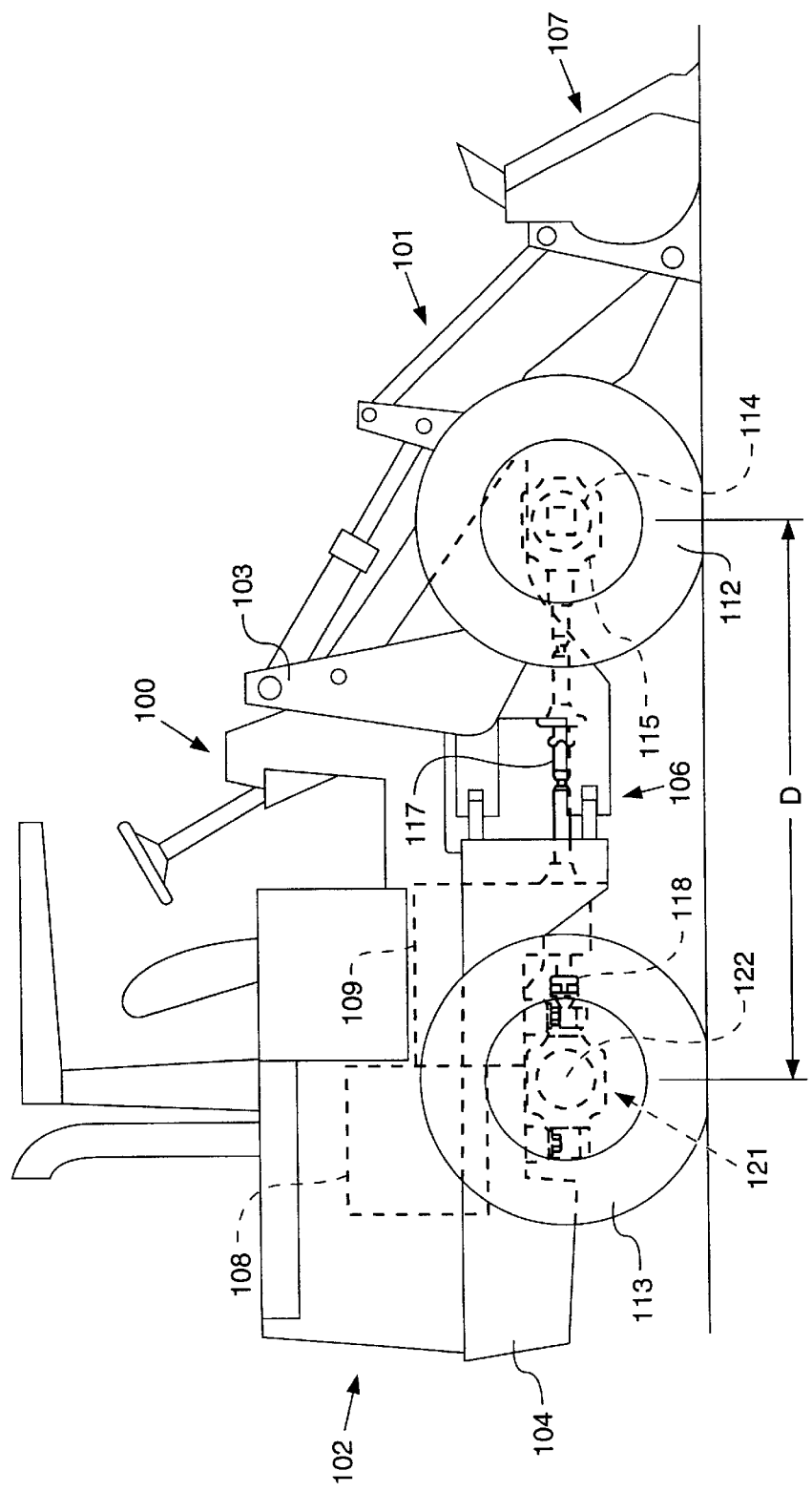
FIG. 1 is a diagrammatic elevation view of a work machine that embodies the principles of the present invention.

Referring to the drawings and particularly to FIG. 1, there is illustrated a vehicle embodied herein for exemplary purposes as a work machine 100 having a forward portion 101 and a rearward portion 102. The work machine 100 of the type described herein includes a front frame 103, a rear frame 104, and an interconnecting articulation joint shown generally at 106. Also shown is an exemplary work implement comprising a bucket 107 pivotally connected to the front frame 103. An engine 108 and transmission and transfer drive mechanism 109 are mounted on the rear frame 104 and operatively connected to power a pair of front wheels 112 and rear wheels 113. The front wheels 112 are driven through fixed front axles 114 and differential mechanism 115, and a front drive line 117 which transmits power from the transfer drive mechanism 109 to the differential of the front axle. A rear drive line and U-joint system 118 transmit power from the transmission and transfer drive mechanism 109 to the oscillating rear axle assembly 121 comprising rear axles 122 separated from the front axles 114 by a distance D typically referred to as the vehicle's wheelbase. Although a work machine is used herein to describe the present invention, it should be understood that the present invention, which will be fully described as this disclosure progresses, can be practiced with any vehicle incorporating an axle.

Figure 2:
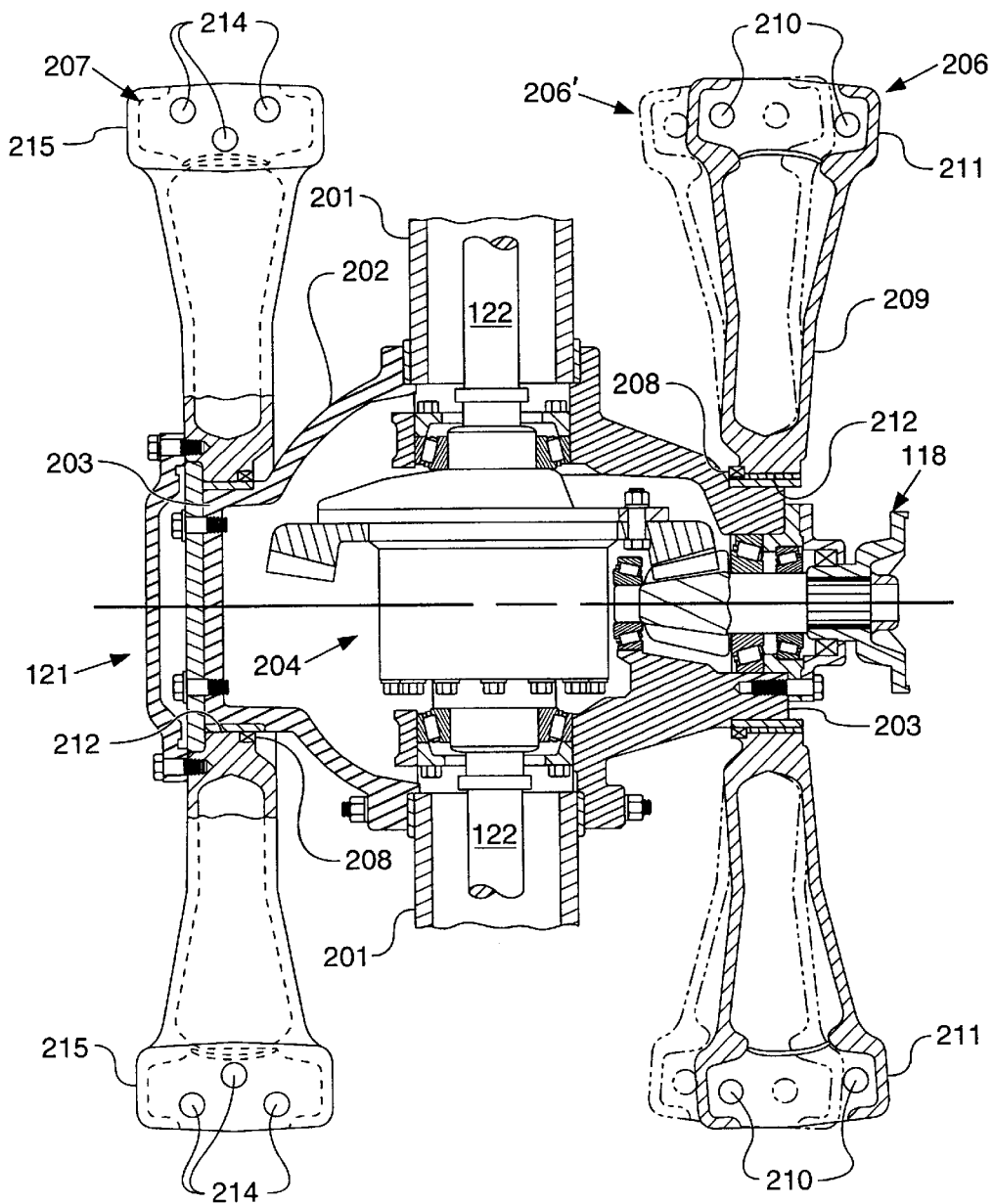
FIG. 2 is diagrammatic partial sectional view of the rear axle assembly of the work machine shown in FIG. 1.
Figure 3:
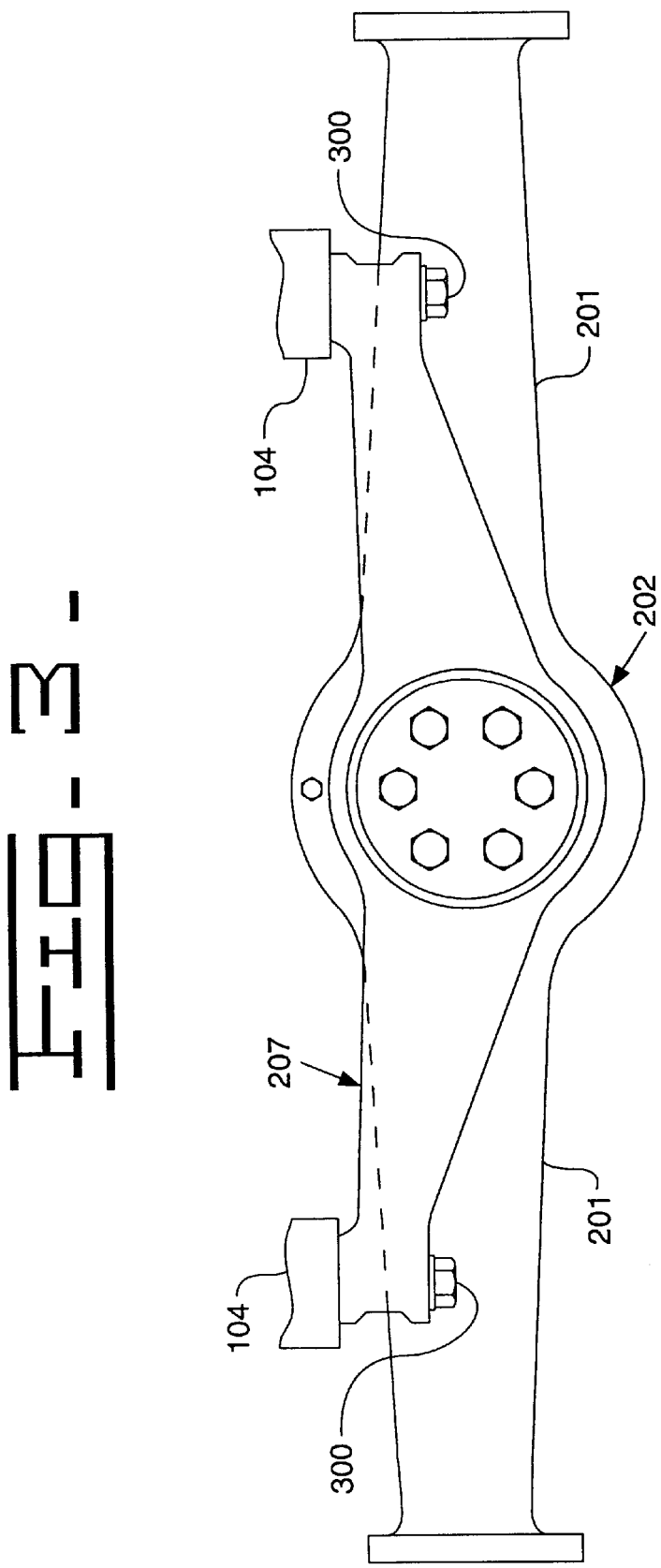
FIG. 3 is an diagrammatic elevation view of the rear axle assembly as mounted to a frame.

Referring now to FIGS. 2 and 3, shown is an exemplary rear axle assembly 121 used to drive the rear wheels 113 of work machine 100. As should be apparent to those skilled in such art, the rear axle assembly 121 shown herein is conventional and commercially available and hence will not be described in any greater detail than necessary to fully teach the principles of the present invention. As shown, the rear axle assembly 121 includes a pair of oppositely extending axle housing portions 201, intermediate the inner ends of which is secured a differential housing portion 202 having opposing trunnion portions 203. A differential gearset assembly is shown generally at 204 and is used to transmit power from the rear drive line and U-joint system 118 to the rear axles 122 which extend coaxially of the axle housing portions 201.

The rear axle assembly 121 is supported on opposing sides of the rear axles 122 by support structures comprising front support structure 206 and a rear support structure 207. More specifically, the trunnions 203 are supported in a conventional manner within each respective front and rear support structure 206,207 by a wear sleeve and sleeve bearing combination 208 attached to a cylindrical through bore 212 of each support structure 206,207. As shown, the rear support structure 207 preferably comprises a substantially linear structure, whereas the front support structure 206 preferably comprises a best or curvilinear structure. As should be appreciated by those skilled in such art, and for reasons which will become apparent as this disclosure progresses, the front support structure 206 is adapted for reversible coupling to the rear frame 104. In other words, the front support structure 206 may be coupled to the rear frame 104 in preferably two orientations: a first orientation denoted 206 in which a concave face 209 of the front support structure 206 is directed towards the forward portion 101 of the work machine 100, and a second orientation denoted 206' in which the concave face 209 is directed towards the rearward portion 102 of the work machine 100.

As is further shown in FIG. 2, preferably two front support structure openings 210 are provided on each end 211 of the front support structure 206. Likewise, preferably three rear support structure openings 214 are provided on each end 215 of the rear support structure 207. As will be discussed further with respect to FIGS. 4 and 5, each of the respective front and rear support structure openings 210,214 are used to securely couple the rear axle assembly 121 to the rear frame 104.

Shown in FIGS. 4 and 5 is a portion of the rear frame 104 comprising mounting surfaces 400 for each respective front and rear support structure 206,207 (each shown in phantom detail) having a plurality of attachment structures comprising front frame openings 401 and rear frame openings 402. As shown, the front frame openings 401 are sized and arranged to overlay corresponding front support structure openings 210. Likewise, the rear frame openings 402 are sized and arranged to overlay a corresponding rear support structure openings 214. The rear frame openings 402 are divided into preferably a first rear frame opening group 405 and a second rear frame opening group 406 which provide optional attachment points for the rear support structure 207. As shown, each first and second rear frame opening group 405,406 may have at least one common rear frame opening 402. Mechanical fasteners 300 are preferably used to secure each front and rear support structure 206,207 to respective front and rear frame openings 401,402.

As should be appreciated by those skilled in such art, the provision of optional attachment points along the longitudinal length of the frame allows for variable wheelbase configurations for a vehicle having a single-sized frame structure. For example, and with reference to FIG. 4, shown is the rear support structure 207 coupled to first rear frame opening group 405 with the front support structure 206 oriented in the aforementioned first orientation designated 206. For comparative purposes, a base line 409 is used to denote a fixed location on the rear frame 104 with line 410 denoting an exemplary centerline position of the rear axles 122 when the support structures 206,207 are attached to the rear frame 104 in the above manner. As should be apparent to those skilled in such art, the aforementioned configuration shown in FIG. 4 provides for a first separation distance D1 between the front and rear axles 114,122.

In comparison, shown in FIG. 5 is the rear support structure 207 coupled to second rear frame opening group 406 with the front support structure 206 oriented in the aforementioned second orientation designated 206'. Again, an exemplary centerline location of the rear axles 122 relative to the base line 409 is denoted by line 500. As should also be apparent to those skilled in such art, the aforementioned configuration shown in FIG. 5 provides for a second separation distance D2 between the front and rear axles 114,122 with the second separation distance D2 being preferably greater than the first separation distance D1. Hence, the work machine 100 is provided with alternative wheelbase choices. Advantageously, to provide variable wheelbase configurations using the curvilinear front support structure 206 described herein, only a single set of front frame openings 401 need be provided which can accommodate the front support structure 206 regardless of its orientation. It should be apparent to those of ordinary skill in such art that a variety of wheelbases can be obtained by spacing the rear frame openings 402 accordingly to match the selected curvilinear characteristics of the front support member 206.

INDUSTRIAL APPLICABILITY

With respect to the drawings, the present invention provides optional wheelbase configurations for a vehicle having a single-size frame. Commonality of parts used to provide the various wheelbase configurations include a curvilinear front support structure 206 which can be reversibly attached to the rear frame 104. In other words, and with reference to FIG. 4, the front support structure 206 can be attached to the rear frame 104 in a first orientation denoted 206 which provides the work machine 100 with a chosen wheelbase D1. When the front support structure 206 is arranged in this manner, the rear support structure 207 is coupled with the first or forward-most first rear frame opening group 405.

Conversely, a longer wheelbase D2 may be obtained by reversing or "flip-flopping" the front support structure 206, designated 206' in FIGS. 2 and 5, thereby placing the front support structure 206' in the second orientation, and coupling the rear support structure 207 to the second rear frame opening group 406. Advantageously, only a single set of front frame openings 401 are required to couple the front support structure 206 with the rear frame 104 regardless of the chosen orientation of the front support structure 206.

What is claimed is:

1. An axle mounting arrangement for a vehicle having a frame, a front axle, a rear axle, a forward portion and a rearward portion, comprising:
   a plurality of attachment structures provided on the frame;
   an axle assembly having a differential; and
   at least one support structure for coupling the axle assembly with said attachment structures, said at least one support structure being adapted for reversible coupling with the frame so as to provide said at least one support structure with a first orientation and a second orientation with respect to the frame wherein said coupling of said at least one support structure with the frame at the first orientation provides a different wheelbase for the vehicle than the coupling of said at least one support structure with the frame at the second orientation.

2. The axle mounting arrangement as set forth in claim 1 wherein said attachment structures comprise frame openings.

3. The axle mounting arrangement as set forth in claim 2 wherein said support structure includes support structure openings adapted to correspond with said frame openings.

4. The axle mounting arrangement as set forth in claim 2 wherein said support structure includes a front support structure and a rear support structure.

5. The axle mounting arrangement as set forth in claim 4 wherein at least one of said front support structure and said rear support structure includes a bent support structure.

6. An axle mounting arrangement for mounting an axle assembly to the frame of a vehicle having a front axle, a rear axle, a forward portion and a rearward portion, comprising:
   a plurality of attachment structures provided on the frame;
   at least one support structure for coupling the axle assembly with said attachment structures at different longitudinal locations along the frame;
   wherein said attachment structures comprise frame openings;
   wherein said support structure includes a front support structure and a rear support structure;
   wherein at least one of said front support structure and said rear support structure includes a bent support structure; and wherein said bent support structure is adapted for reversible coupling with the frame so as to provide said bent support structure with a first orientation and a second orientation with respect to the frame.

7. The axle mounting arrangement as set forth in claim 6 wherein said bent support structure has a concave face directed towards the rearward portion of the vehicle when said bent support structure is coupled to the frame in said second orientation.

8. The axle mounting arrangement as set forth in claim 6 wherein said bent support structure has a concave face directed towards the forward portion of the vehicle when said bent support structure is coupled to the frame in said first orientation.

9. The axle mounting arrangement as set forth in claim 6 wherein said attachment structures comprise at least one front frame opening for coupling said front support structure with the frame, and at least a first and a second rear frame opening group having rear frame openings adapted for coupling said rear support structure with the frame.

10. The axle mounting arrangement as set forth in claim 9 wherein said first and said second rear frame opening groups have at least one common rear frame opening.

11. The axle mounting arrangement as set forth in claim 9 wherein said front support structure is coupled in said first orientation when said rear support structure is coupled to said first rear frame opening group, and said front support structure is coupled in said second orientation when said rear support structure is coupled to said second rear frame opening group.

12. The axle mounting arrangement as set forth in claim 9 wherein the front axle and the rear axle are separated by a first distance when said rear support structure is coupled to said first rear frame opening group, and the front axle and the rear axle are separated by a second distance when said rear support structure is coupled to said second rear frame opening group.

13. The axle mounting arrangement as set forth in claim 12 wherein said first distance is greater than said second distance.

14. An axle mounting system for a single-size frame of a vehicle, said vehicle having a rear axle assembly having differential housing trunnions, comprising:

a bent front support structure adapted for supporting the rear axle assembly;

a substantially linear rear support structure adapted for supporting the rear axle assembly; and a plurality of fasteners for coupling said front support structure and said rear support structure with the frame, said plurality of fasteners being cooperative with the front and rear support structures and the frame in a predetermined manner to provide multiple wheelbase configurations of the vehicle.

15. The axle mounting system as set forth in claim 14 wherein said front support structure and said rear support structure are adapted to engage the differential housing trunnions.

16. An axle mounting arrangement, comprising:

a frame having front frame openings and rear frame openings, said rear frame openings including a first rear frame opening group and a second rear frame opening group;

an engine coupled to said frame;

a front axle assembly having a pair of front axles, and a rear axle assembly having a pair of rear axles;

a transmission coupling said engine with said front axles and said rear axles;

a pair of front wheels coupled with said front axles;

a bent front support structure adapted for supporting said rear axle assembly on one side of said rear axles, said front support structure adapted for reversible attachment with said front frame openings;

a substantially linear rear support structure adapted for supporting said rear axle assembly on the other side of said rear axles, said rear support structure adapted for attachment with at least one of said first rear frame opening group or said second rear frame opening group; and a plurality of fasteners for coupling said front support structure and said rear support structure with said frame.

* * * * *